US008638705B2

(12) United States Patent
Park et al.

(10) Patent No.: US 8,638,705 B2
(45) Date of Patent: Jan. 28, 2014

(54) METHOD FOR TRANSMITTING CHANNEL QUALITY INDICATOR

(75) Inventors: Giwon Park, Gyeonggi-Do (KR); Kiseon Ryu, Gyeonggi-Do (KR); Youngsoo Yuk, Gyeonggi-Do (KR); Yongho Kim, Gyeonggi-Do (KR); Jinyoung Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 13/380,787

(22) PCT Filed: Aug. 20, 2010

(86) PCT No.: PCT/KR2010/005554
§ 371 (c)(1),
(2), (4) Date: Jan. 30, 2012

(87) PCT Pub. No.: WO2011/021897
PCT Pub. Date: Feb. 24, 2011

(65) Prior Publication Data
US 2012/0134331 A1    May 31, 2012

Related U.S. Application Data

(60) Provisional application No. 61/235,692, filed on Aug. 21, 2009, provisional application No. 61/237,658, filed on Aug. 27, 2009.

(30) Foreign Application Priority Data

Dec. 3, 2009  (KR) ........................ 10-2009-0119336

(51) Int. Cl.
*G08C 17/00*    (2006.01)

(52) U.S. Cl.
USPC ........... 370/311; 370/329; 370/341; 455/343; 340/7.32; 713/300

(58) Field of Classification Search
USPC ............ 370/311, 329, 341; 455/343.1–343.6, 455/450–464, 509, 574; 340/7.32–7.38; 713/300–322
See application file for complete search history.

(56) References Cited

U.S. PATENT DOCUMENTS

| 2005/0049013 A1* | 3/2005 | Chang et al. ................. 455/574 |
| 2008/0026744 A1 | 1/2008 | Frederiksen et al. |
| 2008/0267302 A1* | 10/2008 | Cai et al. ....................... 375/260 |
| 2009/0067374 A1* | 3/2009 | Yoon et al. .................... 370/329 |
| 2009/0201861 A1 | 8/2009 | Kotecha |
| 2010/0254291 A1* | 10/2010 | Youn et al. .................... 370/311 |

FOREIGN PATENT DOCUMENTS

WO    WO 2009/035232    3/2009

* cited by examiner

*Primary Examiner* — Mark Rinehart
*Assistant Examiner* — Mang Yeung
(74) *Attorney, Agent, or Firm* — McKenna Long & Aldridge LLP

(57) ABSTRACT

Disclosed is a method for transmitting channel quality indicator (CQI) during a sleep mode operation. The method for transmitting CQI includes: receiving a message including a CQI-related parameter indicating a transmission of a CQI before a listening window; transmitting a CQI during a sleep window before the listening window according to a CQI-related parameter in the message; transitioning to the listening window according to a listening window-related parameter after transmitting the CQI; and waiting for receiving a message indicating whether or not there is data or traffic transferred from the base station during the listening window.

7 Claims, 3 Drawing Sheets

METHOD FOR TRANSMITTING CHANNEL QUALITY INDICATOR

This Application is a 35 U.S.C. §371 National Stage Entry of International Application No. PCT/KR2010/005554, filed on Aug. 20, 2010, which claims the benefit of priority to Provisional Application Nos. 61/235,692, filed on Aug. 21, 2009, 61/237,658, filed Aug. 27, 2009 and Korean Patent Application No: 10-2009-0119336, filed on Dec. 3, 2009, all of which are hereby incorporated by reference in their entirety for all purposes as if fully set forth herein.

TECHNICAL FIELD

The present invention relates to a method for transmitting a channel quality indicator (CQI).

BACKGROUND ART $2^{nd}$-generation mobile communication refers to transmission and reception of voice through mobile communication, which includes CMDA, GSM, and the like. GPRS, advancing from the GSM, has been proposed to provide a packet switched data service based on the GSM system.

$3^{rd}$-generation mobile communication allows for transmission and reception of image and data, as well as voice, and 3GPP (Third Generation Partnership Project) has developed a mobile communication system (IMT-2000) technique and adopts WCDMA as a radio access technology (RAT). The combination of the IMT-2000 technique and the radio access technology (RAT), e.g., WCDMA, is called a UMTS (Universal Mobile Telecommunication System). UTRAN is an acronym of UMTS Terrestrial Radio Access Network.

Meanwhile, the $3^{rd}$-generation mobile communication is evolving to $4^{th}$-generation mobile communication. Two techniques are issued as the $4^{th}$-generation mobile communication technique: one is a long-term evolution network (LTE) technique under standardization by 3GPP and the other is a technique proposed by IEEE. The IEEE 802.16m is called an advanced air interface (AAIF), and both TDD and FDD can be supported by the advanced air interface.

FIG. 1 shows an example of a frame structure according to the IEEE 802.16 technique.

With reference to FIG. 1, a superframe has a length of 20 ms, and each superframe is configured with four radio frames having a length of 5 ms.

The superframe may include a superframe header (SFH). The superframe header includes essential control information which is to be necessarily acquired when a terminal enters a network at an early stage or when terminal performs handover. The superframe header plays a similar role as a broadcast channel (BCH) in the LTE technique. The superframe header (SFH) may be allocated to a first radio frame among a plurality of radio frames constituting the superframe.

Each of the radio frames includes a plurality of subframes. The subframe may be allocated for download and upload transmission. The number of subframes constituting one frame may vary as 5, 6, 7, and 8 depending on the bandwidth of a system or the length of a cyclic prefix (CP). Also, the number of OFDMA symbols constituting a single subframe may vary. First, a type-1 subframe may include six OFDMA symbols, a type-2 subframe may include seven OFDMA symbols, a type-3 subframe may include five OFDMA symbols, and a type-4 subframe may include nine OFDMA symbols. In the two subframe types, some of the symbols are idle symbols.

FIG. 1 shows a case in which when bandwidth are 5 MHz, 10 MHz, or 20 MHz, the length of the CP is ⅛ Tb (Tb: useful OFDMA symbol time).

The frame structure illustrated in FIG. 1 can be applicable to a time division duplexing (TDD) scheme or a frequency division duplexing (FDD) scheme. The TDD scheme refers to a scheme in which an entire frequency band is used as uplink or downlink and an uplink transmission and a downlink transmission are discriminated in a time domain, and the FDD scheme refers to a scheme in which a uplink transmission and a downlink transmission occupy different frequency bands and simultaneously made.

Meanwhile, in a wider broadband mobile communication system, power consumption is a critically significant factor compared with other systems. As one of methods for minimizing power consumption, a sleep mode operation between a terminal and a base station has been proposed.

In the related art sleep mode operation, in a state that the terminal performs communication with a base station in an active mode, when there is not more traffic to be transmitted to or received from the base station, the terminal is changed from the active state to a sleep mode.

Entering the sleep mode state, the terminal receives a message indicating whether or not there is traffic transferred from the base station during a sleep mode listening window (LW), and in this case, when the terminal receives a negative indication indicating that there is no traffic, the terminal determines that there is no data traffic transmitted to downlink, and increases a current sleep mode cycle.

In addition, when the terminal receives a positive indication from the base station during the LW, the terminal determines that there is data traffic transmitted to downlink, so it initiates the current sleep mode period.

FIG. 2 illustrates a general sleep mode operation.

When there is no more data traffic to be transmitted or received in a normal mode, the terminal transmits an SLP-REQ message requesting changing to a sleep mode to the base station (S11), receives an SLP-RSP message including a sleep mode operation parameter such as a sleep cycle, a listening window, and the like, from the base station (S13) to change the state into the sleep mode.

When the terminal first changes the state into the sleep mode, it applies a first sleep cycle SC1 including only a first sleep window SW1 to operate the sleep mode. After the first sleep cycle SC1 is terminated, the terminal applies a second sleep cycle SC2 including a second listening window LW2 and a second sleep window SW2 to operate the sleep mode.

When the terminal receives a TRF-IND message including a negative indication during the second listening window LW2 in the second sleep cycle SC2 (S15), the terminal determines that there is no data traffic transmitted to downlink, and maintains a sleep mode doubled compared to the first sleep cycle SC1.

After the doubled sleep cycle SC2 is terminated, when the terminal receives a TRF-IND message including a positive indication during a third listening window LW2 of a third sleep cycle (S17), the terminal extends (ELW3) the listening window in order to receive generated data traffic, and receives data traffic from the base station (S19), and then enters a sleep interval SW3 to perform a sleep mode operation. In this case, as illustrated, the third sleep mode interval SC3, including the listening window LW3, the extended listening window ELW3, and the sleep window SW3, is reset into the first sleep mode interval SC1.

Meanwhile, a wireless channel has abnormal characteristics such as a path loss, noise, a fading phenomenon due to multipath, an intersymbol interference (ISI), or Doppler effect due to terminal mobility, or the like. Thus, various techniques are being developed in order to overcome the abnormal characteristics of the wireless channel and enhance reliability of radio communication.

An adaptive modulation and coding (AMC) scheme is a technique for enhancing reliability of radio communication. In order to support AMC, a mobile communication system may use a channel quality indicator (CQI). The CQI is information regarding a channel state between a base station and a terminal. The base station determines a modulation and coding scheme (MCS) used for a transmission by using the CQI received from the terminal. When the base station determines that a channel state is good based on the CQI, the base station may increase a modulation order or a coding rate to increase a transfer rate. When the base station determines that a channel state is not good based on the CQI, the base station may reduce the modulation order or the coding rate to lower the transfer rate. When the transfer rate is lowered, a reception error rate can be reduced.

Information regarding channel quality is used as essential information in determining an adaptive modulation and channel coding (AMC) level with respect to the corresponding terminal. Thus, the terminal must transmit the channel quality indicator (CQI) to the system at every frame.

As for a periodical transmission of the CQI, the CQI is transmitted at a period given by a base station or at a predetermined period without a request from the base station. When the CQI is periodically transmitted, CQI information amount, a modulation scheme, a channel coding scheme, and the like, may be previously determined. In this case, overhead of signaling required for the CQI transmission can be reduced.

However, the periodical transmission of the CQI is made when the terminal is in the normal mode.

FIG. 3 shows the problem of the related art.

As noted in FIG. 3, in the related art, the terminal can transmit the CQI while it is operating in the listening window LW, but cannot periodically transmit the CQI when the terminal is operating in the sleep window SW.

In order for the base station to draw a reliable MCS level, the base station must acquire a plurality of CQI from the terminal. However, as illustrated, for example, in order for the base station to transmit data during the second listening window LW2, it needs to acquire a sufficient number of CQIs. However, the base station receives CQIs only during the first listening window LW1 and cannot receive CQIs during the sleep window SW, resulting in that the base station cannot acquire sufficient CQIs.

In addition, the interval between the listening windows LWs is very long. In a situation that channels are changed suddenly, the suddenly changing channel situation cannot be suitably coped with only with the CQI information received only during the listening window. In addition, because the interval between the listening windows is very long, the base station cannot properly know about an average channel situation only with the CQIs received during the listening window.

In addition, as shown, the difference between a time point at which the base station receives a CQI and a time point at which the base station transmits data at the second listing window is too short.

DISCLOSURE OF INVENTION

Solution to Problem

Therefore, in order to address the above matters, the various features described herein have been conceived. An object of the present invention is to allow a base station to transmit data at a proper MCS level during a listening window.

Another object of the present invention is to allow terminal to transmit a channel quality indicator (CQI) properly.

To achieve these and other advantages and in accordance with the purpose of the present invention, as embodied and broadly described herein, there is provided a method for transmitting channel quality indicator (CQI) during a sleep mode operation. The method for transmitting CQI may include: receiving a message including a CQI-related parameter indicating a transmission of a CQI before a listening window; transmitting a CQI during a sleep window before the listening window according to a CQI-related parameter in the message; transitioning to the listening window according to a listening window-related parameter after transmitting the CQI; and waiting for receiving a message indicating whether or not there is data or traffic transferred from the base station during the listening window.

The message may be received before entering a sleep mode or may be received in response to a sleep mode request message. Or, the message may be a downlink sleep control extended header (SCEH) received within the sleep window.

The parameter may indicate one or more of a transmission number and transmission period of a CQI before the listening window. Or the parameter may indicate one or more of a frame index and period for transmitting the CQI before the listening window.

To achieve these and other advantages and in accordance with the purpose of the present invention, as embodied and broadly described herein, there is also provided a method for transmitting data in a base station. The data transmission method may include: transmitting a message including a channel quality indicator (CQI)-related parameter indicating transmission of a CQI before a listening window to a terminal; receiving a CQI during a sleep window before the listening window from the terminal; determining an MCS level based on the CQI received during the sleep window; and transmitting data applied as the determined MCS level to the terminal during the listening window.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
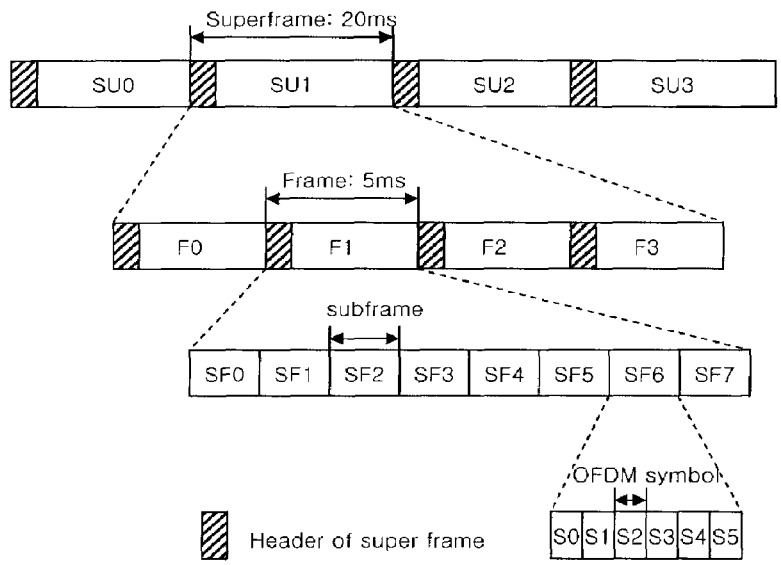
FIG. 1 shows an example of a frame structure according to the IEEE 802.16 technique.
Figure 2:
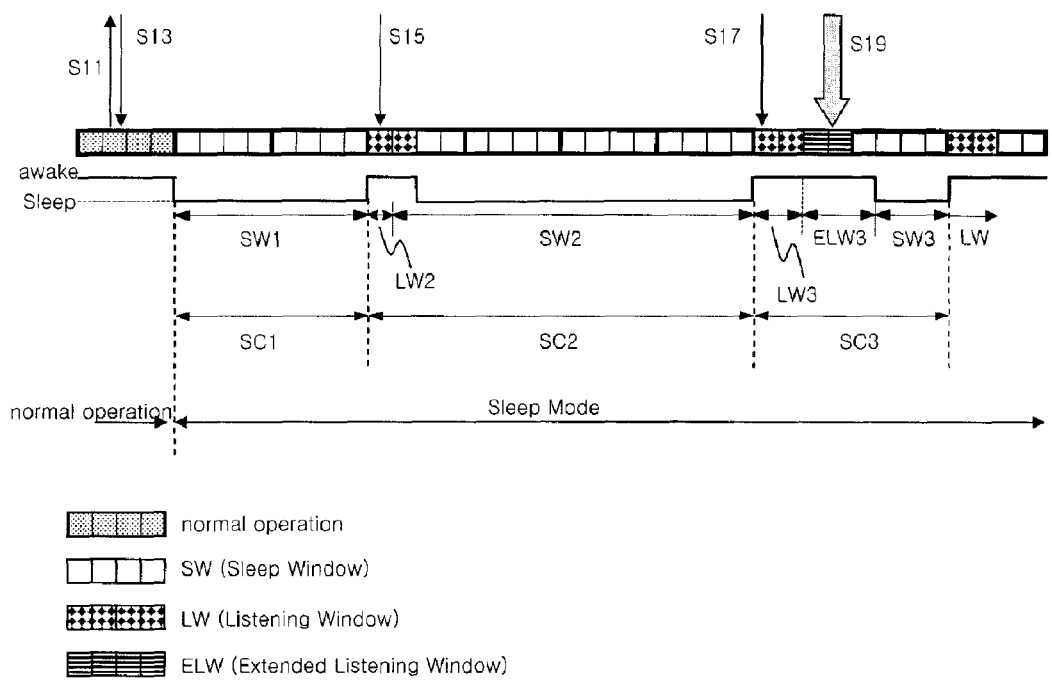
FIG. 2 illustrates a normal sleep mode operation
Figure 3:
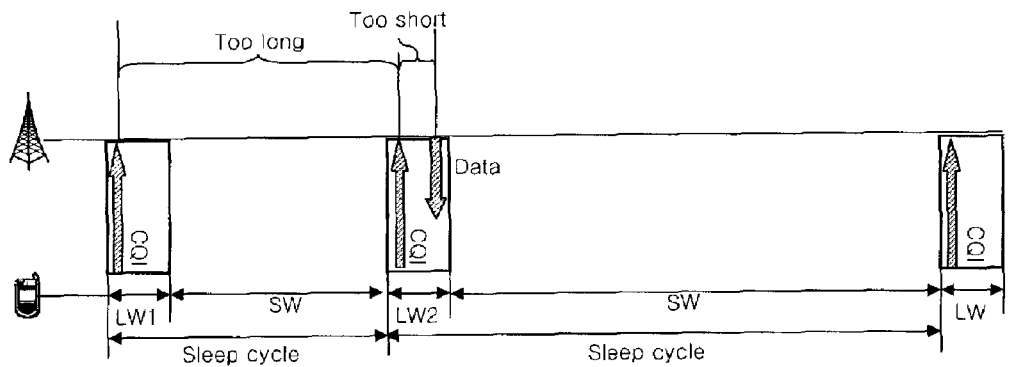
FIG. 3 shows a problem of the related art.

The present invention can be applicable to any communication system and method to which a technical idea of the present invention is applied.

The present invention may be embodied in many different forms and may have various embodiments, of which particular ones will be illustrated in drawings and will be described in detail. However, it should be understood that the following exemplifying description of the invention is not meant to restrict the invention to specific forms of the present invention but rather the present invention is meant to cover all modifications, similarities and alternatives which are included in the spirit and scope of the present invention. The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The terms used in the following description of the present invention will now be explained before describing the exemplary embodiments of the present invention.

In the following description, a terminal is used, but the terminal may be also referred to as a term such as a subscriber station (SS), a user equipment (UE), mobile equipment (ME), mobile station (MS), or the like. Also, the UE may be a portable device such as a mobile phone, a PDA, a smartphone, a notebook computer, and the like, or a non-portable device such as a PC or a vehicle-mounted device.

Figure 4:
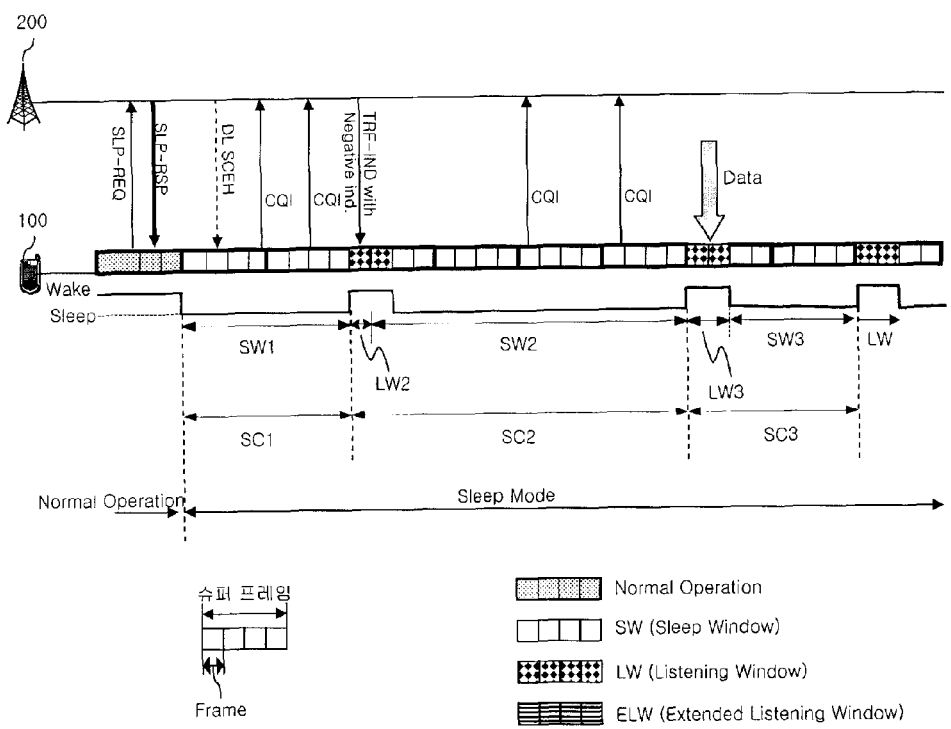
FIG. 4 illustrates a method according to a first exemplary embodiment of the present invention on a frame structure.
Figure 5:
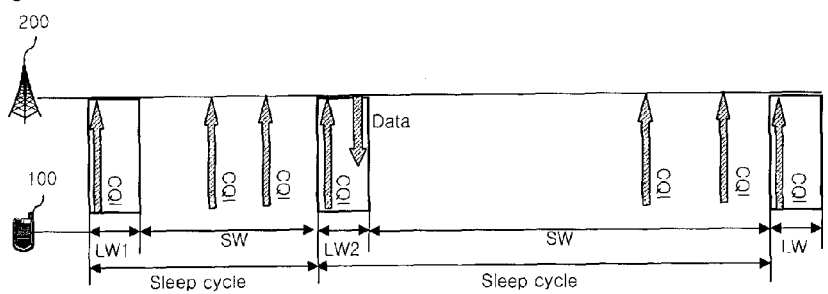
FIG. 5 illustrates a variant of the first exemplary embodiment of the present invention.

FIG. 4 illustrates a method according to a first exemplary embodiment of the present invention on a frame structure, and FIG. 5 illustrates a variant of the first exemplary embodiment of the present invention.

As shown in FIG. 4, according to the method of an exemplary embodiment of the present invention, a base station 200 may instruct the terminal 100 to complete transmission of a channel quality indicator (CQI) before a listening window LW arrives. Accordingly, the terminal 100 periodically transmits CQIs before the listening window LW arrives.

This will be described in detail with reference to FIG. 4.

When there is no data traffic to be transmitted or received in a normal mode state, the terminal 100 transmits an SLP-REQ message requesting a change into a sleep mode to the base station 200. When the terminal 100 receives an SLP-RSP message including a sleep mode operation parameter (or sleep parameter) such as a sleep cycle, a listening window, and the like, from the base station 200, the terminal 100 changes its state into the sleep mode. In this case, the SLP-RSP message may include a parameter instructing the terminal 100 to transmit a CQI before the listening window LW arrives. The parameter may be an NCQI parameter as shown in Table 1 below.

TABLE 1

| Name | Value | Description |
|---|---|---|
| Response_Code | 0b00: Request by ABS<br>0b01: Approval of SLP-REQ<br>0b11: Reserved | It indicates a response type of SLP-RSP message |
| Operation | 0b00: Termination of sleep mode<br>0b01: Entering sleep mode<br>0b10: Changing sleep mode<br>0b11: changing set sleep cycle | It indicates an operation type of SLP-RSP message |
| SCID | 0~15 | Sleep cycle ID |
| TIMF | 0~1 | Traffic indication message flag<br>0: TRF-IND message is not transmitted<br>1: TRF-IND message is transmitted during listening window |
| LWEF | 0~1 | Listening window extension flag |
| NISCF | 0~1 | New initial sleep cycle indicator |
| Start Frame Number | 0~63 | LSB of frame number |
| Initial Sleep Cycle | 0~15 | It indicates duration allocated for initial sleep cycle maintaining sleep state in sleep mode |
| Final Sleep Cycle | 0~1023 | Period allocated for final sleep cycle |
| Listening Window | 0~63 | Period of default listening window of terminal.<br>Listening_Window can be lengthened when UL/DL data exists between terminal and base station. |

TABLE 1-continued

| Name | Value | Description |
|---|---|---|
| Listening sub-frame bitmap | Each bit of bitmap indicates as follows: 1: AMS awakes in particular subframe 0: AMS does not awake in particular frame | Bitmap indicating subframe when terminal needs to be awake in each frame |
| SLPID | 0~1023 | Unique ID in base station |
| New Initial Sleep Cycle | 0~63 | When sleep cycle is reset, if this parameter value has been set, current sleep cycle is set by this value |
| $N_{CQI}$ | 0~3 | $N_{CQI}$ is CQI feedback of terminal. Terminal can transmit can transmit CQI feedback $N_{CQI}$ times before listening window. |
| T_AMS | 0~31 | Timer for extending listening window of terminal |
| REQ_duration | 0~255 | Time to be waited for retransmission of SLP-REQ messages |

Meanwhile, when the terminal 100 requests entry into the sleep mode, it may include an NCQI parameter indicating the number of transmissions of CQI desired by the terminal 100 in a request message, e.g., an SLP_REQ message. For example, the SLP_REQ message may be as follows as shown in Table 2 below:

TABLE 2

| Name | Value | Description |
|---|---|---|
| Operation | 0b00: Termination of sleep mode 0b01: Entering sleep mode 0b10: Changing sleep mode 0b11: changing set sleep cycle | This indicates operation request type of AAI_SLP-REQ message |
| SCID | 0~15 | Sleep cycle ID |
| TIMF | 0~1 | Traffic indication message flag 0: TRF-IND message is not transmitted 1: TRF-IND message is transmitted during listening window |
| LWEF | 0~1 | Listening window extension flag |
| NISCF | 0~1 | New initial sleep cycle indicator |
| Start Frame Number | 0~63 | New initial sleep cycle indicator |
| Initial Sleep Cycle | 0~15 | LSB of frame number |
| Final Sleep Cycle | 0~1023 | It indicates duration allocated for initial sleep cycle maintaining sleep state in sleep mode |
| Listening Window | 0~63 | Period of default listening window of terminal. Listening_Window can be lengthened when UL/DL data exists between terminal and base station. |
| Listening sub-frame bitmap | Each bit of bitmap indicates as follows: 1: AMS awakes in particular subframe 0: AMS does not awake in particular frame | Bitmap indicating subframe when terminal needs to be awake in each frame |
| New Initial Sleep Cycle | 0~31 | When sleep cycle is reset, if this parameter value has been set, current sleep cycle is set by this value |
| T_AMS | 0~31 | Timer for extending listening window of terminal |
| $N^{CQI}$ | 0~3 | $N_{CQI}$ is CQI feedback of terminal. Terminal can transmit can transmit CQI feedback $N_{CQI}$ times before listening window. |

Meanwhile, the terminal 100 may receive a parameter indicating a completion of transmission of a CQI before the listening window LW arrives from the base station 200 during the sleep window. The parameter may be an NCQI parameter indicating a transmission number or a transmission period of the CQI as described above. The parameter may be included in a downlink sleep control extend header (DL SCEH) as illustrated and received.

TABLE 3

| Syntax | Size (bit) | Description |
|---|---|---|
| SCEH ( ) { LAST | 1 | 0 = different extension header follows 1 = there is no extension header |
| Type | TBD | SCEH Type |
| SCEH sub-type | 1 | 0 = listening window control 1 = sleep cycle resume indicator |
| If (SCEH sub-type == Listening Window Control) { | | |
| Listening window end or extension | 1 | 0 = listening window end indicator 1 = listening window extension indicator |
| Last frame of Extended Listening Window | 8 | Valid when listening window end indicator or extension indicator is set to 1 |
| $N^{CQI}$ | 2 | $N_{CQI}$ is CQI feedback of terminal. Terminal can transmit CQI feedback $N_{CQI}$ times before listening window |
| } else { Schedule Sleep Cycle Interruption included | 1 | 0 = Schedule Sleep Cycle Interruption is not included in sleep cycle resume indicator 1 = Schedule Sleep Cycle Interruption is included in sleep cycle resume indicator |

TABLE 3-continued

| Syntax | Size (bit) | Description |
| --- | --- | --- |
| If (Schedule Sleep Cycle Interruption included == 1) { | | |
| Start Frame Offset for Schedule Sleep Cycle Interruption | 8 | Frame number from frame including SCEH when sleep cycle is interrupted |
| } } } | | |

Alternatively, instead of the NCQI parameter, a parameter indicating an index (e.g., a frame number) of a frame for the terminal 100 to transmit a CQI feedback and a parameter indicating a period may be used. The parameter indicating an index of a frame for transmitting the CQI may be a CQIframenumber parameter as illustrated in Table 4 shown below. The parameter indicating a period may be a CQIperiod as illustrated in Table 4 shown below. The two parameters may be transmitted through an SLP-REQ message, an SLP-RSP message, or a DL SCEH.

TABLE 4

| Syntax | Notes |
| --- | --- |
| $CQI^{framenumber}$ | Frame number for transmitting CQI Feedback |
| $CQI^{period}$ | Period for transmitting CQI Feedback |

As described so far, the base station 200 can instruct the terminal 100 should complete transmission of the CQI before the listening window LW arrives by transferring parameters through the three types of methods, namely, through the SLP-REQ message, the SLP-RSP message, and the DL SCEH.

Then, as shown, the terminal 100 transmits a CQI feedback to the base station 200 according to the foregoing NCQI parameter, the $CQI_{framenumber}$ parameter, and the $CQI_{period}$ parameter before the listening window LW arrives. For example, when $N^{CQI}$ value is set to 2, the terminal may transmit CQI feedback two times through a CQI channel allocated before the LW interval.

The base station 200 may determine a current channel situation based on the CQI feedback received from the terminal 100 and transmit downlink data by applying an MCS level suitable for the current channel situation to the listening window LW interval the same to the terminal 100.

Meanwhile, as shown in FIG. 5, in a modification of the present invention, the terminal 100 may transmit the CQI before the listening window LW arrives and during the listening window LW.

The methods according to the present invention described thus far can be implemented as software, hardware or their combination. For example, the method according to the present invention may be stored in a storage medium (e.g., an internal memory, a flash memory, a hard disk, and the like), and may be implemented as codes or commands in a software program that can be executed by a processor. Such an implementation will now be described with reference to FIG. 6.

Figure 6:
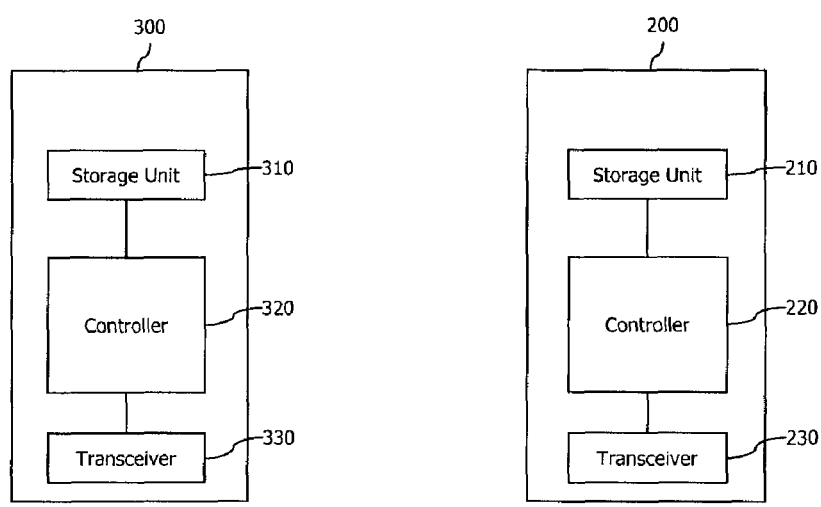
FIG. 6 is a schematic block diagram of a base station and a terminal according to an exemplary embodiment of the present invention.

FIG. 6 is a schematic block diagram of a base station and a terminal according to an exemplary embodiment of the present invention.

As shown in FIG. 6, the base station and the terminal include a controller, a storage unit, and a transceiver, respectively. The storage unit stores a software program implementing the foregoing method, and the controller executes the method stored in the storage unit. The transceiver transmits or receives a bandwidth allocation message or an uplink radio resource information message, e.g., a UL-MAP, under the control of the controller.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for transmitting channel quality indicators (CQIs) by a terminal during a sleep mode operation, the method comprising:
 transmitting a sleep mode request message to a base station to request to enter into a sleep mode which comprises a sleep window and a listening window;
 receiving a message from the base station, the message including a CQI-related parameter indicating a number of times which the terminal is to transmit CQIs during the sleep window before the listening window;
 transmitting the CQIs to the base station as much as the number of times during the sleep window;
 transitioning to the listening window according to a listening window-related parameter after transmitting the CQIs; and
 monitoring the listening window to receive a message indicating whether or not there is data or traffic transferred from the base station.

2. The method of claim 1, wherein the message is received in response to the sleep mode request message.

3. The method of claim 1, wherein the message is a downlink sleep control extended header (SCEH) received within the sleep window.

4. The method of claim 1, wherein the message further includes a second parameter which indicates a transmission period of the CQIs to be transmitted during the sleep window.

5. A method of transmitting data by a base station, the transmission method comprising:
 receiving a sleep mode request message from a terminal to request to enter into a sleep mode which comprises a sleep window and a listening window;
 transmitting a message to the terminal, the message including a channel quality indicator (CQI)-related parameter indicating a number of times which the terminal is to transmit CQIs during the sleep window before the listening window;
 receiving the CQIs from the terminal as much as the number of times during the sleep window;
 determining a modulation and coding scheme (MCS) level based on the CQIs received during the sleep window; and
 transmitting data applied as the determined MCS level to the terminal during the listening window.

6. The method of claim 5, wherein the message is a downlink sleep control extended header (SCEH) received within the sleep window.

7. The method of claim 5, wherein the message further includes a second parameter which indicates a transmission period of the CQIs to be transmitted during the sleep window.

* * * * *